(12) United States Patent
Lika

(10) Patent No.: US 8,540,873 B2
(45) Date of Patent: Sep. 24, 2013

(54) RING FILTER INSERT FOR A LIQUID FILTER

(75) Inventor: Torsten Lika, Stuttgart (DE)

(73) Assignee: Mahle International GmbH (DE)

( * ) Notice: Subject to any disclaimer, the term of this patent is extended or adjusted under 35 U.S.C. 154(b) by 945 days.

(21) Appl. No.: 12/520,268

(22) PCT Filed: Nov. 2, 2007

(86) PCT No.: PCT/EP2007/061824
§ 371 (c)(1),
(2), (4) Date: Dec. 22, 2009

(87) PCT Pub. No.: WO2008/074562
PCT Pub. Date: Jun. 26, 2008

(65) Prior Publication Data
US 2010/0155318 A1 Jun. 24, 2010

(30) Foreign Application Priority Data
Dec. 20, 2006 (DE) .......................... 10 2006 060 129

(51) Int. Cl.
*B01D 27/08* (2006.01)
*B01D 27/14* (2006.01)
*B01D 35/16* (2006.01)

(52) U.S. Cl.
USPC ........... 210/232; 210/240; 210/248; 210/440; 210/441; 210/443; 210/450

(58) Field of Classification Search
USPC ................. 210/232, 240, 248, 440, 441, 443, 210/450
See application file for complete search history.

(56) References Cited

U.S. PATENT DOCUMENTS

| 3,984,325 | A | * | 10/1976 | Rosaen | 210/236 |
| 4,976,852 | A | * | 12/1990 | Janik et al. | 210/86 |
| 5,084,162 | A | * | 1/1992 | Conti | 210/232 |
| 5,300,223 | A | * | 4/1994 | Wright | 210/232 |
| 5,490,930 | A | * | 2/1996 | Krull | 210/443 |
| 5,525,225 | A | * | 6/1996 | Janik et al. | 210/436 |
| 5,685,985 | A | * | 11/1997 | Brown et al. | 210/450 |

(Continued)

FOREIGN PATENT DOCUMENTS

| EP | 0662337 | 8/1997 |
| EP | 0889229 | 1/1999 |
| EP | 1389273 | 5/2002 |

*Primary Examiner* — Thomas M Lithgow
(74) *Attorney, Agent, or Firm* — Rader, Fishman & Grauer PLLC

(57) ABSTRACT

A ring filter insert (3) which can be flowed through radially has, in at least one of its end disks (4, 5), at least one connecting channel (28) which runs radially between interior and exterior of this end disk (4; 5). With such a ring filter insert (3), through a liquid supply channel (14) which is conducted through the central inner space of the ring filter insert (3) which serves as the crude space or clean space, it is possible in construction and rational terms to pass liquid through the at least one connecting channel (28) in at least one of the two end disks (4, 5) of the ring filter insert (3) from the radial inside outward into one of the two crude spaces or clean spaces which are sealed from the other crude space or clean space and communicate only through the filter medium of the ring filter insert (3). The flow through the at least one connecting channel (28) in at least one of the two end disks (4, 5) may also be in the reverse direction from the radial outside inward.

20 Claims, 3 Drawing Sheets

(56) References Cited

U.S. PATENT DOCUMENTS

Figure 1:
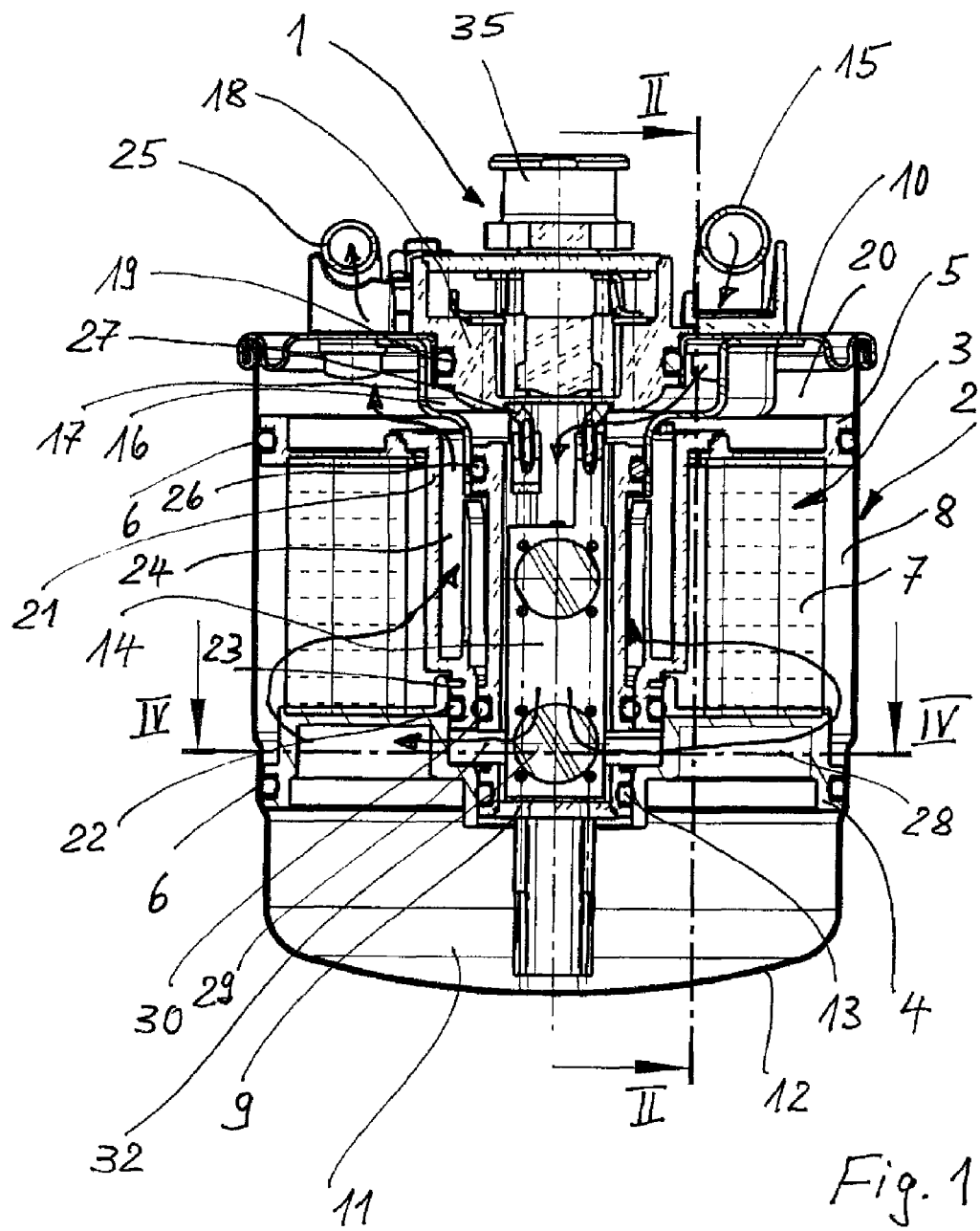

| | | | |
|---|---|---|---|
| 5,788,859 A * | 8/1998 | Biere | 210/312 |
| 5,951,862 A * | 9/1999 | Bradford | 210/305 |
| 5,985,144 A * | 11/1999 | Janik et al. | 210/233 |
| 6,187,188 B1 * | 2/2001 | Janik et al. | 210/232 |
| 2004/0050804 A1 | 3/2004 | Dittmann et al. | |
| 2008/0272046 A1 * | 11/2008 | Lampert et al. | 210/312 |

* cited by examiner

RING FILTER INSERT FOR A LIQUID FILTER

CROSS-REFERENCES TO RELATED APPLICATION

This application is a National Stage application which claims the benefit of International Application No. PCT/EP2007/061824 filed Nov. 2, 2007, which claims priority based on German Patent Application No. 102006060129.7, filed Dec. 20, 2006, both of which are hereby incorporated by reference in their entirety.

The invention relates to a ring filter insert for a liquid filter according to the preamble of the patent claim 1 and to a liquid filter equipped therewith. The liquid filter can be formed, in particular, as a fuel filter with a collecting chamber for water separated in this filter from the fuel.

According to the invention, the filter insert, including the whole liquid filter, is to be formed in a manner that it can be produced efficiently and hence be cost efficient.

For this purpose, a generic filter insert according to the invention is formed according to the characterizing feature of the claim 1. A generic filter with such a filter insert is also subject matter of the invention, wherein the liquid filter, in particular in this form, can be formed as a fuel filter in which during the filtration, separated water is collected in a water collecting chamber and is discharged from there to the outside.

Advantageous and suitable developments of the invention are subject matter of the sub-claims.

The invention is primarily based on the general idea to convey liquid, which is centrally supplied in the area of the ring filter axis to a filter housing with a ring filter insert supported therein, through at least one channel provided in one of the two end disks from radially inside radially outwards into a filter crude chamber located radially outside. An end disk with such a channel can be manufactured extremely efficiently as one piece, in particular from plastic. Producibility as one piece is possible in a simple manner by means of, for example, cores which can be demolded after molding from a mold, in particular, an injection mold.

An advantageous exemplary embodiment, which is described hereinafter in more detail, is illustrated in the drawing.

Figure 2:
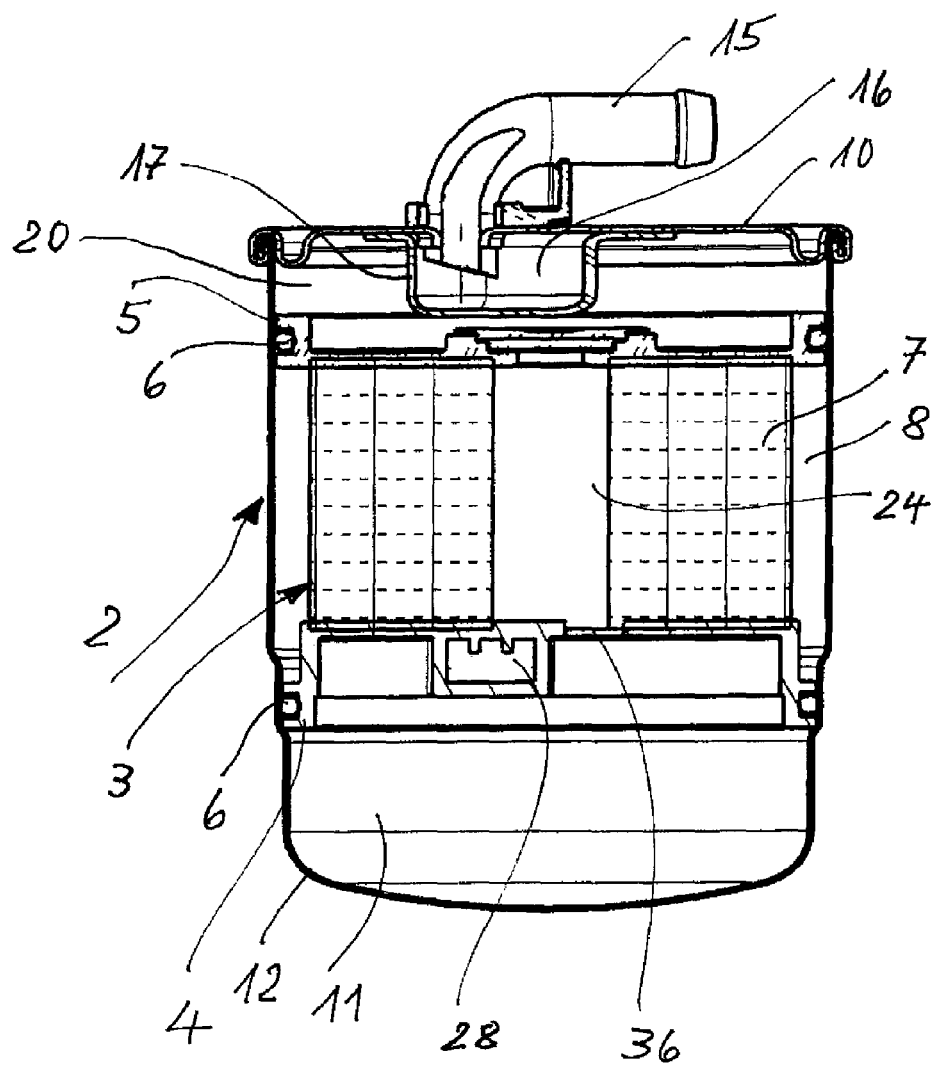
Figure 3:
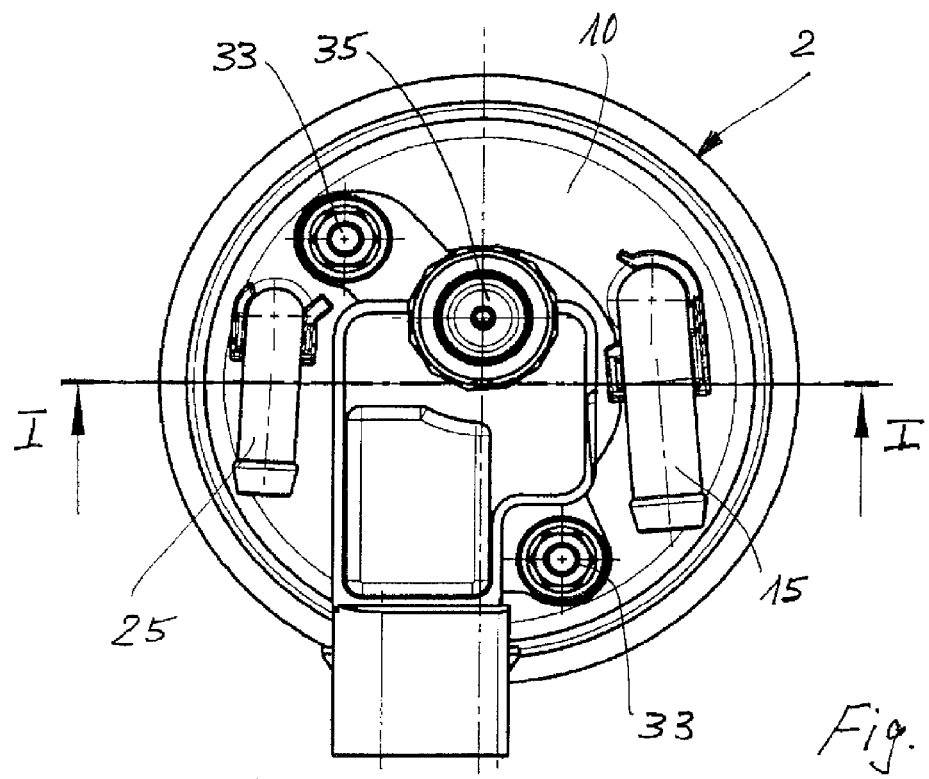
Figure 4:
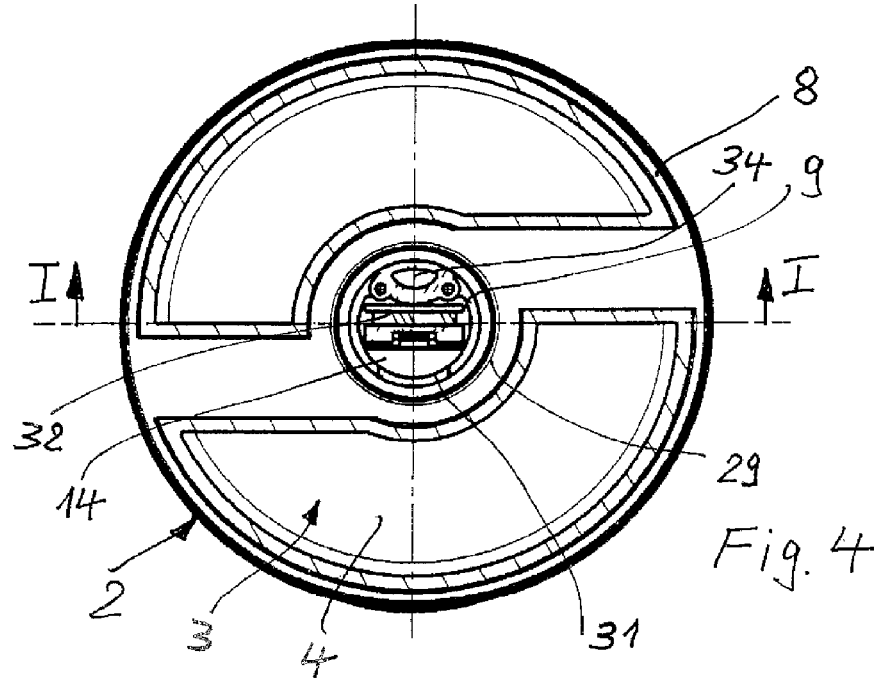

In the figures:

FIG. 1 shows a longitudinal cross-section along each of the lines I-I in FIG. 3 or 4 of a filter in which a filter housing is replaceably attached on a detachable rod for forming an operational filter, FIG. 2 shows a cross-section of the filter housing along line II-II in FIG. 1, FIG. 3 shows a top view on the filter according to FIG. 1, FIG. 4 shows a cross-section along line IV-IV in FIG. 1.

A fuel filter for an internal combustion engine of a motor vehicle comprises a filter housing 2 which can be removably connected to a rod device 1 and which has a ring filter insert 3 supported therein, through which a flow can pass radially from outside inwards.

The ring filter insert 3 is sealed on the front side by means of a first end disk 4 and a second end disk 5. Both end disks 4, 5 each are provided radially outside with a first sealing ring 6 by means of which the two end disks 4, 5 are radially sealed with respect to the filter housing 1. The space located between the two first sealing rings 6 of the two end disks 4 and 5 between a filter medium 7 of the ring filter insert 3 and the filter housing 2 is part of the filter crude chamber 8.

A rod 9 as part of the rod device 1 penetrates the ring filter insert 3 from a first front side 10 of the filter housing 2 and extends into a receiving chamber 11 of the filter housing 2. This receiving chamber 11 is bordered, on the one hand, by an area of the filter housing 2 at the second front side 12 thereof, as well as by the first end disk 4, wherein this first end disk 4 is sealed radially outside by means of the first sealing ring 6 with respect to the filter housing 2 and is sealed radially inside by means of a second sealing ring 13 with respect to the rod 9. The rod 9 has a fuel supply channel 14 communicating with an inlet port 15 which penetrates the first front face 10 of the filter housing 2. The fuel supply channel 14 inside the rod 9 communicates within the filter housing via a chamber 16 with the inlet port 15. The chamber 16 is bordered by a port 17, which is fixed connected and sealed to the inner side of the first front side 10 of the filter housing 2 and which centrally engages in an axial sub-area by means of the second end disk 5 with the ring filter insert 3, and a head area 18 of the rod device 1 comprising the rod 9. The head area 18 is sealed here by means of a third sealing ring 19 with respect to the first front side 10 of the filter housing 2. The port 17 penetrates, in the interior of the filter housing 2, a chamber 20 located between the first end disk 5 and the first front side of the filter housing. Within this chamber 20, the port 17 has a radial protrusion in the area of the inlet port 15 to allow the required connection with respect to the fuel supply channel 14 within the rod 9.

On the outflow side, that is, on the clean side of the filter medium 7 of the ring filter insert 3, an annular separating element 21 is provided. This separating element 21 is fixed connected and sealed to the second end disk 5. With respect to the first end disk 4, a detachable, sealed connection is in place. The sealing is carried out by means of a sixth sealing ring 22 between the radial outside of an axial end area of the separating element 21 and a radial inner area of a collar 23 of the first end disk 4. The chamber 20 is part of the filter clean chamber 24 and communicates to the outside of the filter housing 2 via a discharge port 25 provided in the first front side 10 of the filter housing 2. A separation between the crude chamber 16 and the clean chamber 24 of the filter is carried out in the area of the second end disk 5 between the rod 9 and the port 17 by means of a fourth sealing ring 26. Between the chamber 16 located on the crude side and the fuel supply channel 14 within the rod 9, openings 27 provided in the rod device 1 between the head area 18 thereof and the rod 9 serve as a conveying connection. These openings 27 are virtually a result of the fact that the head area 18 of the rod device 1 is connected to the rod 9 only by ribs 27 which are circumferentially spaced apart from each other.

The flow through the filter is indicated by flow arrows.

The path of the flow arrows shows that fuel flowing from the crude side through the fuel supply channel 14 enters in the area of the first end disk 4 from radially inside radially outwards into the area of the filter crude chamber 8 located upstream of the filter medium 7.

The feed of the fuel from radially inside radially outwards in the aforementioned area takes place as follows.

In the first end disk 4, two radial connection channels 28, approximately running in diametrically opposite directions, are provided. In case of a first end disk 4 consisting of plastic, such an end disk can be produced as a molded part with removable molding cores which form the channels 28. In this manner, such an end disk 4 can be produced efficiently as one piece.

In the selected cross-section of the filter housing in FIG. 1, the inside of the channels 28 is not recognizable. In the sections of FIGS. 2 and 4, however, the channels 28 are shown in a cross-sectional view so that their path is clearly shown herein. The channels 28 end radially open in the area of the filter crude chamber 8 located upstream of the filter medium 7. In the radial inner circumferential area of the first end disk 4, each of the channels 28 end radially in a ring chamber 29. This ring chamber 29 located between the rod 9 and the inner circumference of the first end disk 4 is sealed against the outside, on the one hand, by means of an aforementioned second sealing ring 13, which is provided between the first end disk 4 and the rod 9 and which is adjacent to the receiving chamber 11, and by means of a further fifth sealing ring 30 between the rod 9 and an area of the separating element 21 sealed by means of a third sealing ring 22 with respect to the first end disk 4.

The ring chamber 29 is connected in a conveying manner with the fuel supply channel 14 by means of a slotted opening 31 provided within the rod 9.

Within the rods 9 of the rod device 1, electrical heating elements 32 are provided to be able to heat the fuel flow flowing through the fuel supply channel 14. The electrical heating energy is supplied by means of electrical lines which run through the head area 18 of the rod device 1 and out of the filter housing 2.

The rod device 1 is detachably connected to the first front side 10 of the filter housing 2 by means of screw connections 33.

The receiving chamber 11 is in a conveying connection with the head area 18 of the rod device by means of a flow channel 34 provided within the rod in addition to the fuel supply channel 14. Within the head area 18, a locking element 35 is provided by means of which the flow channel 34 can be closed or opened towards the outside.

The drawn and above described filter represents the embodiment of a fuel filter of an internal combustion engine of a motor vehicle. The separating element 21 on the clean side of the filter medium 7 of the ring filter insert 3 is a so-called coalescer, by means of which water parts can be separated from the fuel. This water separated on the clean side or at the separating element 21 formed as a coalescer, respectively, can discharge into the receiving chamber 11, which serves as a water collecting chamber, through openings 36 provided in the first end disk 4 and penetrating the same radially inside. On the radial inner circumference of the first end disk 4, a plurality of openings 36 can be provided, only one of which is shown in a cross-section in FIG. 2. The separated water collected in the receiving chamber 11 can be discharged through the flow channel 34 within the rod 9, either by means of suction or by a pressure applied by the fuel to be cleaned and flowing through the filter. For discharging of water out of the receiving chamber 11, the locking element 35 is to be opened temporarily.

The structure of the filter allows detaching the filter housing 2 from the rod device 1. This means that the filter housing 2, including the ring filter insert 3, can be changed in case of a filter which is worn out for operational reasons, while the rod device 1 is still maintained.

A fuel filter of the described and drawn type is mounted to the engine, for example, by means of a metallic tightening strap, wherein this not-drawn tightening strap is placed in the housing area adjacent to the first front side 10 of the filter housing 2.

In case of a required filter change, the tightening strap is untightened so that the filter housing 2 is then attached only to the, for example, flexible lines for inflow and outflow of the fuel which are connected to the ports 15 and 25. In this condition, the filter housing 2 can be separated from the reusable rod device 1 by disconnecting the screw connections 33 and can be replaced by a new one.

A far as seals are provided at the rod device 1, by means of which seals areas of the filter housing 2 to be replaced, or parts supported therein, respectively, are sealed, these seals can be replaced during a filter change.

In the mounted condition, the filter must have an operational position in which the receiving chamber 11 is positioned downwards to allow a gravity-driven disposal of the separated water.

All features illustrated in the description and in the following claims can be essential for the invention, individually as well as combined with one another in any form.

The invention claimed is:

1. A filter device which can be flowed-through, comprising:
   a first annular and a second annular end disk for a liquid ring filter,
   a cylindrical filter housing, in which the ring filter is supported within the filter housing,
   a central mounting opening provided at an axial end of the filter housing and a cylindrical rod which serves as a liquid supply device, wherein the filter housing is reversibly slid by the mounting opening onto the rod, and wherein the liquid filter device is operational when the filter housing is slid onto the rod, and the rod penetrates the ring filter of the filter at least partially,
   an end of the filter housing facing away from the mounting opening, wherein the first end disk of the ring filter is adjacent to the end of the filter housing-facing away from the mounting opening,
   a radially outer crude chamber and a radially inner clean chamber, wherein the ring filter forms within the filter housing the crude chamber and the clean chamber,
   a receiving chamber, located between the first end disk and the end of the filter housing facing away from the mounting opening, the receiving chamber is provided which is separated from the crude chamber by the first end disk;
   a discharge port for cleaned liquid is provided in an area adjacent to the mounting opening of the filter housing to communicate with the clean chamber within the filter housing, and
   an operational assembly condition of the filter including the ring filter, the filter housing, and the rod,
   wherein the first end disk has at least one connection channel;
   which connects an interior of the rod conveying liquid to be cleaned and the crude chamber.

2. A filter device according to claim 1, wherein the at least one connection channel is arranged within the first end disk.

3. A filter device according to claim 1, wherein:
   i. the receiving chamber is located between a clean chamber side and a crude chamber side and communicates with a flow channel running through the rod towards the outside of the rod, and
   ii. the clean chamber of the filter housing communicates with the receiving chamber by openings provided in the first end disk.

4. A filter device according to claim 1, wherein on each of the first and second end disks, a radially outer circumferential area is provided in each of which the ring filter is configured to abut tightly against the filter housing for forming the filter crude chamber enclosable by sealed areas.

5. A filter device according to claim 2, in each radially outer sealing areas of the end disks, radial sealing rings are provided.

6. A filter device according to claim 2, wherein the at least one connection channel located within the first end disk ends within a radially inner circumferential area of the first end disk in a ring chamber which is located axially between two sealable areas which are sealed with respect to the rod in the operational assembly condition of the filter device.

7. A filter device according to claim 6, wherein the sealable areas provided at the ring filter, between which areas the at least one connection channel exits the respective first end disk radially inwardly, are formed as a sealing contact surface for sealing rings provided at the rod.

8. A filter device according to claim 1, wherein on a clean side of the ring filter, an annular separating element is provided for parts from cleaned liquid.

9. A filter device according to claim 8, wherein:
   i. the annular separating element is fixedly connected to the second end disk, and
   ii. in an area of the separating element adjacent to the first end disk, a section is provided which can be tightly abutted with respect to one of the first end disk and the rod.

10. A filter device according to claim 1, wherein the rod with which the filter housing is configured to be connected in a detachable and sealing manner.

11. A filter device according to claim 10, wherein inside the rod, a heating device formed by means of electrical heating elements is provided.

12. A filter device according to claim 10, wherein the filter housing is formed as an irreversibly closed sheet metal cartridge.

13. A filter device according to claim 10, the ring filter being a fuel filter of an internal combustion engine of a motor vehicle, for which the receiving chamber in the filter housing serves as a water collecting chamber for water which is separated on a clean side of the ring filter from cleaned fuel, and the separating element is formed as a water separator.

14. A filter device according to claim 10, where within the rod, a flow channel is provided for discharging of water collected in the receiving chamber.

15. A filter device according to claim 10, wherein between the second end disk and an adjacent axial front side of the filter housing, a first chamber is provided which is separated from a clean side and is connected with a crude side and which communicates with a liquid supply port running through the filter housing and with the inside of the rod.

16. A filter device according to claim 10, wherein between the second end disk and an adjacent axial front side of the filter housing, a second chamber is provided which is separated from a crude side and is connected with a clean side and which communicates with a discharge port running through the filter housing for cleaned liquid.

17. A filter device according to claim 10, wherein the crude and clean chamber are functionally interchangeable.

18. A filter device according to claim 2, wherein:
   i. the receiving chamber is located between a clean chamber side and a crude chamber side and communicates with a flow channel running through the rod towards the outside of the rod, and
   ii. the clean chamber of the filter housing communicates with the receiving chamber by openings provided in the first end disk.

19. A filter device according to claim 2, wherein on each of the first and second end disks, a radially outer circumferential area is provided in each of which the ring filter is configured to abut tightly against the filter housing for forming the filter crude chamber enclosable by sealed areas.

20. A filter device according to claim 2, in each radially outer sealing areas of the end disks, radial sealing rings are provided.

* * * * *